Dec. 20, 1966     M. J. CRUMPEN     3,293,647
DOPPLER ANTENNA ARRAY WITH FEED SWITCHING
Filed March 14, 1963
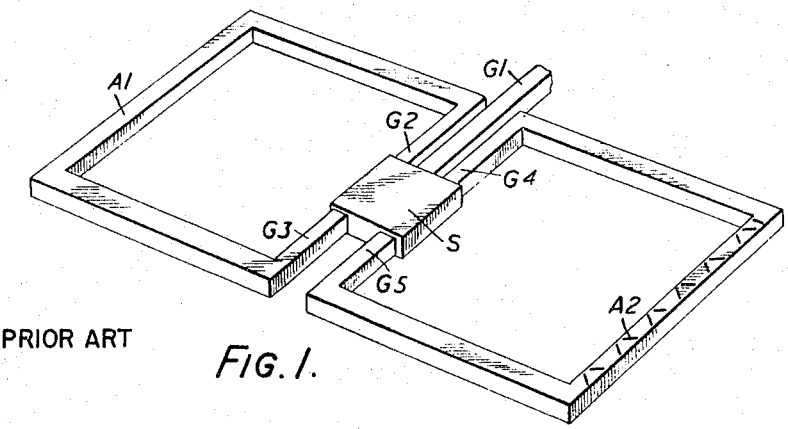
PRIOR ART   FIG. 1.
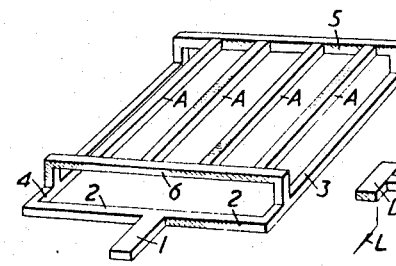   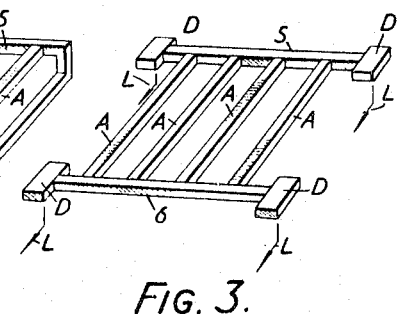
FIG. 2.     FIG. 3.
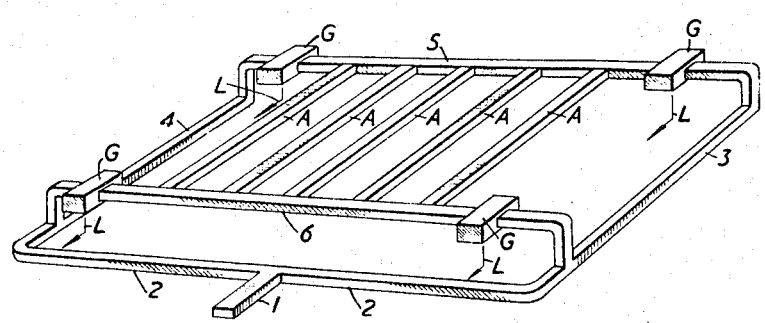
FIG. 4.
INVENTOR
Mervyn James Crumpen
BY
Baldwin & Wight
ATTORNEYS United States Patent Office 3,293,647
Patented Dec. 20, 1966

3,293,647
DOPPLER ANTENNA ARRAY WITH
FEED SWITCHING
Mervyn James Crumpen, Chelmsford, Essex, England, assignor to The Marconi Company Limited, a British company
Filed Mar. 14, 1963, Ser. No. 265,121
Claims priority, application Great Britain, Mar. 19, 1962, 10,399/62
6 Claims. (Cl. 343—768)

This invention relates to Doppler navigation aiding equipments and directional aerial systems for use therein.

Doppler navigation aiding equipments are of great value for aiding the navigation of aircraft. In such equipments radio beams are transmitted in different downward directions from an aircraft and reflected back to the aircraft from the earth's surface, the Doppler shifts (due to aircraft motion relative to the earth's surface) occasioned to the reflected energies of the different beams being utilised in the aircraft to deduce its speed and/or drift.

Present day practice in Doppler navigation aiding equipments is to use a distributing switch (which may be electrical or mechanical) to supply energy from a radio transmitting source in turn to a number of aerial feed points. Thus, for example, in a Doppler navigation aiding equipment with four downwardly and outwardly directed aerials directed respectively to port and forward, to port and aft, to starboard and forward and to starboard and aft there would be a distributor switch which feeds the aerials in a predetermined time sequence from a transmitting source. A corresponding arrangement may be used for receiving the Doppler-shifted earth-reflected waves. An improved, known type of Doppler navigation aiding equipment having the advantage that the number of aerials necessary for obtaining a given number of differently directed beams is reduced by a factor of two employs slotted waveguide aerials, each of which will give one direction of directivity when connected to a transmitter or receiver at one end and another when connected to said transmitter or receiver at the other. Forms of such two-directional slotted waveguide aerials are described and claimed in my previous British Patent No. 813,934.

FIGURE 1 of the accompanying drawings shows, in highly simplified schematic manner, a typical aerial arrangement using two two-directional slotted waveguide aerials, each in accordance with British Patent No. 813,-934, to obtain four differently directed beams in a Doppler navigation aiding equipment. The waveguide G1 connects a transmitter (assuming the case of transmission) to a distributor switch S which is operated by means (not shown) to supply energy from the transmitter (not shown) in predetermined time sequence in turn to waveguides G2, G3, G4 and G5. Guides G2 and G3 lead respectively to the opposite ends of one slotted waveguide aerial A1 and guides G4 and G5 lead respectively to the opposite ends of the other slotted waveguide aerial A2. A similar arrangement is used for the reception of the earth-reflected Dopper-shifted waves, a receiver (not shown) being connected to the main guide corresponding to guide G1 in FIGURE 1.

The above described and other known arrangements depending for their operation on the use of distributor switches have important defects inherent in the use of such switches. A distributor switch, however carefully designed and made, employed to take received signals in turn from a number of received signal channels to a receiver, is always liable to introduce spurious signals into the receiver. Again, it is usual in Doppler navigation aiding equipments of the nature herein question, to combine information obtained by signals transmitted in and reflected from, one direction with that obtained by signals transmitted in and reflected from another direction and, due to the finite time required for switching, there is necessarily some time lag before the information can be combined if operation depends on distributor switches. The present invention seeks to avoid these defects by eliminating the need for distributor switches.

According to this invention a Doppler navigation aiding equipment includes a directional aerial system with at least one two-directional slotted waveguide aerial adapted to have one or other of two predetermined directions of directivity in dependence upon which end the aerial is fed from or feeds into: two aerial feed channels between which said aerial or aerials is or are connected; and two branch feed channels, one of which connects one end of one aerial feed channel to the corresponding end of the other aerial feed channel and the other of which connects together the remaining ends of the aerial feed channels.

In a transmitting aerial system the two branch feed channels are branched out of a main feed channel connected to a transmitter, one branch feed channel connecting the main feed channel with corresponding ends of the two aerial feed channels and the other branch feed channel connecting said main feed channel with the other ends of said two aerial feed channels.

According to a feature of this invention a Doppler navigation aiding equipment is provided with a receiving directional aerial system with at least one two-directional slotted waveguide aerial adapted to have one or other of two predetermined directions of directivity in dependence upon which end the aerial feeds into; two aerial feed channels between which said aerial or aerials is or are connected; and means for supplying signals derived from the outputs at the ends of the two aerial feed channels to a receiver.

Separate aerial systems may be used for transmission and reception but a single aerial system may be employed for both purposes. In a preferred arrangement of this nature four so-called gyrators (detector-switch units) are provided together with two branch feed channels branched out of a main feed channel, two of the gyrators being interposed between corresponding ends of the two aerial feed channels and one branch feed channel and the other two gyrators beig interposed between the other corresponding ends of the aerial feed channels and the other branch feed channel, means being provided for connecting the detected outputs of the gyrators to a receiver and for connecting the main feed channel to a transmitter. In this system the gyrators are, of course, switches of the Faraday rotation type which separate the transmitted signals from the received signals. They are, however, permanent switches as distinct from distributor switches and do not have a switching cycle—as does the switch S of FIGURE 1—during operation of the equipment so that they do not present the defects which it is the object of the invention to avoid.

In the simplest embodiments of the invention there is only one aerial. Such an arrangement can, of course, give only two directions of directivity but this is enough in some Doppler navigation aiding systems. Preferably, however, there is a plurality of aerials arranged parallel to one another to form a planar array. By suitably choosing the number of aerials in the array and suitably choosing the slot arrangements thereof other even numbers of directions of directivity can be obtained. In most cases four directions will be required, namely, port fore and aft and starboard fore and aft. A convenient number of aerials in the array is four, but other numbers may be used.

Preferably the aerial or aerials is or are in accordance with British Patent No. 813,934.

Preferably also all the feed channels are lengths of waveguide. Although, for convenience in description, different parts of the feed channel system employed are herein referred to by different descriptive terms—for example branch feed channels, and aerial feed channels—they need not be mechanically separate entities and, in practice, they will generally be constituted by different parts of a mechanically unitary waveguide system.

A preferred constructional arrangement for transmission comprises a length of waveguide bent into the shape of a substantially rectangular U; a main guide at right angles to the bottom limit of the U and connecting with it at its mid-point; a first bridging length of waveguide connected across the U between the side limbs thereof near their junction with the bottom limb, said first bridging length being of substantially rectangular C shape with the greater part of its length in a plane parallel to the plane of the U; a second bridging length of waveguide parallel to the first connecting the far ends of the side limbs of the U and having the greater part of its length co-planar with the corresponding part of the first; and a plurality of slotted waveguide aerials connected between the bridging lengths and at right angles thereto, said aerials forming a planar array substantially in the plane in which the greater parts of the bridging guides lie. By adding to this embodiment four gyrators inserted in the bridging lengths, each near a different one of the four ends of the two bridging lengths, the construction may be used both for transmission and reception by connecting the free end of the main guide to a transmitter and taking the detected outputs of the four gyrators to a receiver.

In another arrangement adapted for reception there are a plurality of similar, substantially parallel and co-planar slotted waveguide aerials constituting a planar array; two lengths of waveguide at right angles to the aerials, one across one set of ends thereof and the other across the other set, the ends of the aerials being entered into said lengths of guide where they meet them; four detectors one at the end of the four ends of said lengths of guide; and means for taking the detected outputs of the detectors to a receiver.

The invention is illustrated in FIGURES 2, 3 and 4 of the accompanying drawings. In these figures, which are highly simplified schematic representations, FIGURE 2 shows an aerial system for transmission; FIGURE 3 shows an aerial system for reception; and FIGURE 4 shows an aerial system for both transmission and reception. In order to simplify the drawings in FIGURES 2, 3 and 4 the slots in the slotted waveguide aerials are not represented. It is to be assumed, however, that the said aerials are as described in British Patent No. 813,934.

Referring to FIGURE 2, a main guide 1, the free end of which is connected to a transmitter (not shown) branches out into two branch guides provided by a substantially rectangular U-shaped guide structure comprising a bottom limb 2 and parallel side limbs 3 and 4. The far ends of the limbs 3 and 4 continue into a bridging guide length 5, the greater part of which is in a plane parallel to that in which the lengths 2, 3 and 4 lie. The guide 1 enters the middle of the bottom limb 2. Another bridging guide length 6 similar and parallel to the length 5 connects the side limbs 3 and 4 near where they adjoin the bottom limb 2. Slotted waveguide aerials A constituting a planar array—in FIGURE 2 there are four such aerials—are co-planar with the greater part of the lengths of the bridging guides 5 and 6 and are entered into the bridging guides where they meet them. The aerials A also are equally spaced and symmetrically arranged with respect to the side limbs 3 and 4. The parts 1, 3, 4 and A are parallel to one another and at right angles to the part 2 and the greater parts of the lengths 5 and 6.

With this system, energy from the transmitter is fed to each corner (in effect) of the array after being diverted into separate feed guides by fixed splitters. Beams of energy will accordingly be directed away from the radiating face of the array (considered as a whole) in four different predetermined directions determined in accordance with known principles by the aerial slotting.

FIGURE 3 shows a receiving aerial system. This comprises slotted wave guide aerials A—again four are shown—constituting a planar array and crossed at their ends by waveguides 5 and 6 into which they enter and which are at right angles to the aerials. Each guide 5 and 6 is terminated at its ends by one or other of four terminating detector units D, the output leads L of which are taken to a receiver (not shown). Assuming FIGURES 2 and 3 to show respectively the transmitting and receiving aerial systems of a Doppler navigation aiding equipment, it will be seen that energy transmitted in the four different directions will be received by the receiving array and, depending upon the direction from which it was received, will be directed to a particular one of the four "corners" of the said array each of which has its own termination and receiving channel.

FIGURE 4 shows a modification which will serve both for transmission and reception. It differs from that of FIGURE 2 in only one respect of importance, namely the insertion of the gyrators G near the ends of the bridging lengths 5 and 6. In view of the description already given it is thought that further description of FIGURE 4 is unnecessary. Five aerials A are shown in FIGURE 4 but, as already stated, the invention is not limited to the use of any particular number of aerials.

I claim:

1. A Doppler navigation aiding equipment including a directional aerial system with at least one two-directional slotted waveguide aerial adapted to have either one of two predetermined directions of directivity in dependence upon which end the aerial is fed from or feeds into; two aerial feed channels between which said aerial is connected; and two branch feed channels, one of which connects one end of one aerial feed channel to the corresponding end of the other aerial feed channel and the other of which connects together the remaining ends of the aerial feed channels.

2. A Doppler navigation aiding equipment as claimed in claim 1 and further including means for supplying signals derived from the outputs at the ends of the two aerial feed channels to a receiver.

3. A Doppler navigation aiding equipment as claimed in claim 1 and having a plurality of aerials arranged parallel to one another to form a planar array.

4. A Doppler navigation aiding equipment as claimed in claim 1 wherein all the feed channels are lengths of waveguide.

5. A Doppler navigation aiding equipment having an aerial system connected and arranged to serve both for transmission and reception wherein said system includes four gyrators, two aerial feed channels, and two branch feed channels branched out of a main feed channel, two of the gyrators being interposed between corresponding ends of the two aerial feed channels and one branch feed channel and the other two gyrators being interposed between the other corresponding ends of the aerial feed channels and the other branch feed channel, means being provided for connecting the detected outputs of the gyrators to a receiver and for connecting the main feed channel to a transmitter.

6. A Doppler navigation aiding equipment including a directional transmitting aerial system with at least one two-directional slotted waveguide aerial adapted to have either one of two predetermined directions of directivity in dependence upon which end the aerial is fed from; two aerial feed channels between which said aerial is connected; a main feed channel connected to a transmitter; and two branch feed channels branched out of said main feed channel, one branch feed channel connecting said main feed channel with corresponding ends of the two aerial feed channels and the other branch feed channel connecting said main feed channel with the other ends of the two aerial feed channels.

References Cited by the Examiner

UNITED STATES PATENTS

| | | | |
|---|---|---|---|
| 2,981,948 | 4/1961 | Kurtz | 343—771 |
| 2,983,920 | 5/1961 | Rearwin | 343—771 |
| 2,994,875 | 8/1961 | Stavis | 343—771 |
| 3,078,463 | 2/1963 | Lamy | 343—771 |
| 3,083,362 | 3/1963 | Stavis | 343—771 |
| 3,135,959 | 6/1964 | Moran | 343—768 |

FOREIGN PATENTS 837,093   6/1960   Great Britain.

HERMAN KARL SAALBACH, *Primary Examiner.*

W. K. TAYLOR, E. LIEBERMAN, *Assistant Examiners.*